Aug. 30, 1960   H. Y. KUHL ET AL   2,950,726
EGG WASHER AND EGG HOLDING TRAY
Filed March 5, 1958   2 Sheets-Sheet 1

INVENTORS
HENRY Y. KUHL
BY PAUL R. KUHL

Albert Sperry
ATTORNEY

Aug. 30, 1960 H. Y. KUHL ET AL 2,950,726
EGG WASHER AND EGG HOLDING TRAY
Filed March 5, 1958 2 Sheets-Sheet 2
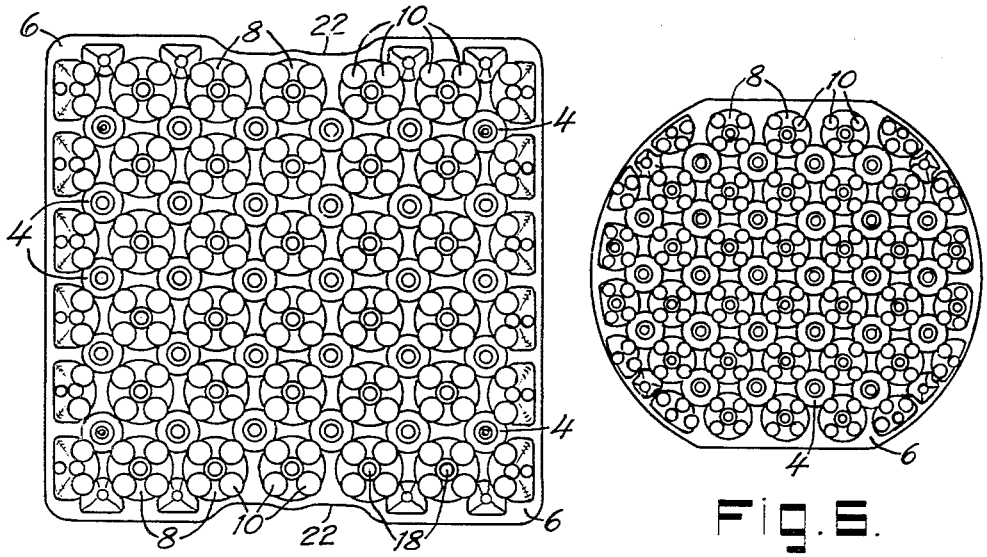
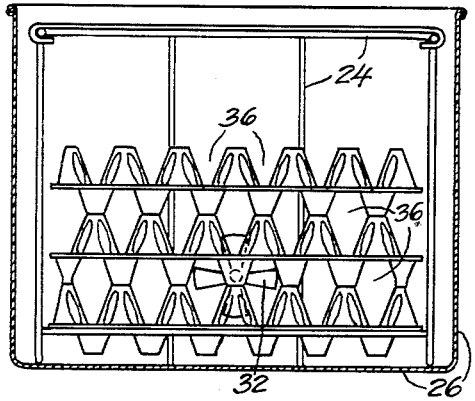
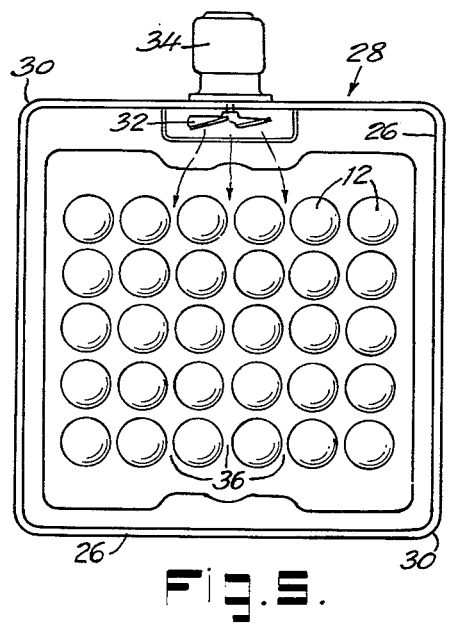
INVENTORS
HENRY Y. KUHL
BY PAUL R. KUHL
Albert Sperry,
ATTORNEY United States Patent Office 2,950,726
Patented Aug. 30, 1960

2,950,726

EGG WASHER AND EGG HOLDING TRAY

Henry Y. Kuhl and Paul R. Kuhl, Box 26, Flemington, N.J.

Filed Mar. 5, 1958, Ser. No. 719,374

6 Claims. (Cl. 134—194)

This invention relates to egg washing equipment and to egg supporting trays used therein.

In collecting eggs the poultryman ordinarily places them in a basket which may be formed of wire or otherwise open at the bottom and sides to permit ventilation and cooling of the eggs. The eggs are necessarily arranged irregularly in such baskets with the result that ventilation is not uniform and, of course, the number of eggs is not indicated and may vary considerably due to differences in size and shape of the eggs.

When the eggs are to be washed, the basket containing the eggs is immersed in a bath of circulating detergent liquid, but the circulation is necessarily varied and erratic in each washing operation due to the different and irregular arrangement and varying size of the eggs. Moreover, the total surface of the eggs being washed varies with their number so that either more or less liquid and detergent may be used at one time than another and the duration of the washing operation must be prolonged unduly in order to assure effective washing of the eggs.

After washing, the basket containing the eggs is removed from the washer and drained and the eggs are allowed to dry. However, some water usually is held on the eggs by capillary attraction at the points of contact between the eggs so that water spots are often formed on the eggs. Moreover, in the subsequent handling of the eggs in arranging them for candling and grading or when placing them in an incubator, packing in a crate or cartons or performing other operations, numerous eggs may be cracked or broken.

In accordance with the present invention, these objections to prior methods and equipment are overcome and means are provided which assure predetermined and orderly arrangement of a definite number of eggs in a manner to establish substantially uniform channels between and about the eggs. As a result, ventilating, washing and drying of the eggs is accomplished more readily and in a controlled manner which reduces the time of contact of the eggs with the washing liquid and increases the efficiency of the washing operation. Moreover, the handling of individual eggs is reduced to a minimum so that cracking, checking and damage to the eggs is materially reduced.

These results are preferably attained by providing egg holding trays having a predetermined number of egg receiving cavities therein arranged in rows or other regular order. The trays are preferably formed to rest one upon another in a holder so as to support the eggs in spaced relation and establish definite channels through which washing liquid may be circulated in a controlled and efficient manner for washing with a predetermined amount of liquid and in a minimum length of time. The trays are further formed to permit rapid and complete drainage of the washing liquid from the eggs and further permit placement of the eggs in crates, incubators and elsewhere without handling of the eggs themselves. In this way, cracking or damaging of eggs is reduced and the condition of the eggs is not impaired.

The washing equipment with which the egg holding trays are used is preferably designed to direct the washing liquid through the channels formed by the trays and into intimate contact with eggs thereon in a manner to develop a mild rubbing action of the eggs against the edges of the openings in the trays so as to aid in the removal of dirt or solid matter from the eggs being washed.

Accordingly, the principal objects of the present invention are to simplify and reduce the amount of handling of eggs and to increase the efficiency of egg washing operations.

A particular object of the invention is to provide a novel type of egg holding tray which facilitates the passage of air and washing liquid into and out of contact with eggs supported on the trays.

A further object of the invention is to provide egg washing means with trays which hold the eggs being washed in a predetermined orderly arrangement presenting regular passages between and about the eggs for controlled flow of washing liquid therethrough.

A specific object of the invention is to provide an egg supporting tray with egg receiving cavities therein which are provided with surfaces and openings arranged to afford a mild rubbing contact of the eggs with the surfaces and edges of the openings upon circulation of washing liquid about the eggs on the trays.

These and other objects and features of the present invention will appear from the following description thereof in which reference is made to the figures of the accompanying drawing.

In the drawing:

Fig. 3 is an enlarged sectional view of a portion of the assembled trays shown in Fig. 1;

Fig. 4 is a vertical sectional view of a portion of a preferred form of egg washer embodying the present invention;

Fig. 5 is a plan view of the washer illustrated in Fig. 3; and

Fig. 6 is a plan view illustrating an alternative form of egg holding tray embodying the present invention.

Figure 1:
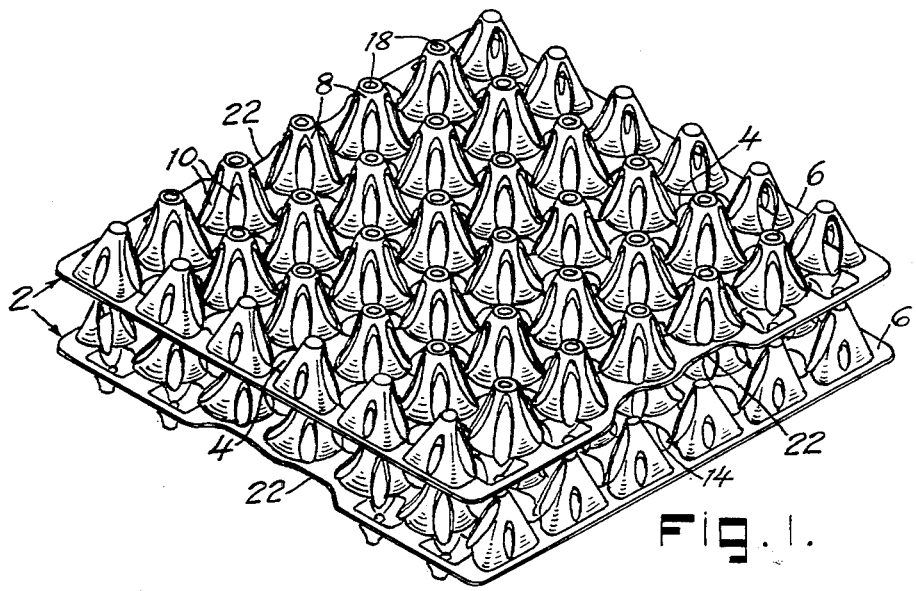
Fig. 1 is a perspective showing a plurality of typical egg holding trays embodying the present invention arranged in stacked relation.
Figure 2:
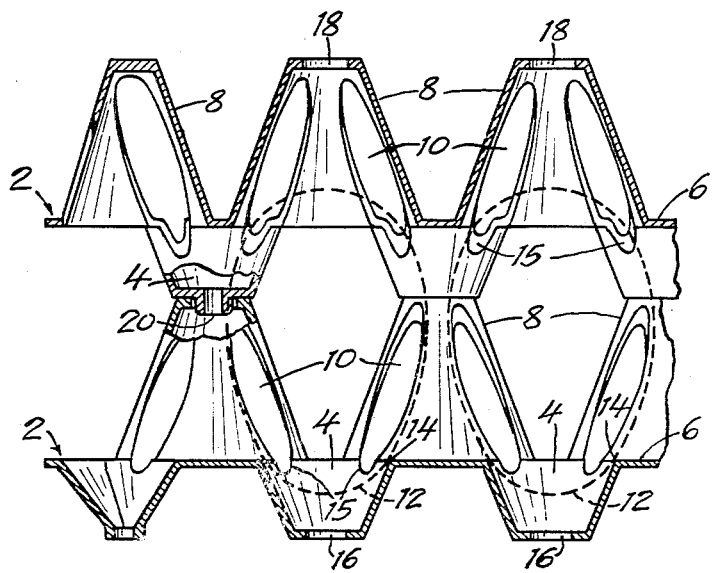
Fig. 2 is a plan view of one of the trays illustrated in Fig. 1.

In that form of the invention shown in Figs. 1 to 5 the egg holding trays 2 are shown as being provided with egg receiving cavities 4 arranged in predetermined number and orderly relation projecting below the rim 6 of the tray. Egg supporting projections 8 extend upward from the plane of the rim 6 of the tray and each projection is formed with openings 10 about the side walls of the projections, these projections extending from points adjacent the plane of the tray to points adjacent the tops of the projections and occupy the major portion of the side walls of the projections so that liquid may circulate freely into and out of contact with eggs supported in the egg receiving cavities 4 of the tray. The eggs 12 are supported adjacent one end of the circular edges 14 of the cavities 4, whereas the sides of the eggs are adjacent and may engage the edges of the openings 10 in the surrounding projections 8 of the tray. The eggs are thus capable of limited tilting movement about the rims 14 of the cavities 4 and the cavities and projections are of such dimensions as to receive and hold either large or small eggs in an orderly arrangement within the tray.

The bottom of each of the cavities 4 is provided with a drainage opening 16, whereas the tops of the projections 8 are provided with similar drainage openings 18. Therefore, when the trays are arranged in stacked relation as shown in Figs. 1 and 3, water or air can pass freely through the drainage openings assuring ample circulation and preventing the retention of water by the trays or about the eggs when the trays and eggs are removed from the washer. However, certain of the downwardly projecting cavities 4 are provided with projections or nipples 20 designed to fit within the drainage openings 18 whereby one tray may be placed in accurate stacked relation with respect to another and held against lateral displacement. The cavities in the tray are preferably arranged in parallel rows with one more row extending in one direction than the other. Thus, the trays illustrated in Fig. 1 have five rows of cavities extending in one direction and six rows of cavities extending in the direction at right angles thereto. The trays can then be turned at 90 degrees from adjacent upper and lower trays in stacking one upon another whereby the downwardly facing hollow interior of the projections 8 on an upper tray are brought into registry with the upwardly facing cavities 4 of the tray beneath. In this way the upper ends of the eggs are positioned within the downwardly facing interior of the projections on the tray above, and the number and arrangement of the upwardly and downwardly facing cavities are the same and they are brought into registry while the rims 6 of the trays are in vertical alignment. Each tray is formed to receive and hold a definite number, say thirty eggs, and the marginal rims 6 of the tray may be formed with cut out portions 22 which serve as finger openings allowing each tray to be grasped at its edges for handing thereof. The eggs are thus handled in groups of thirty and in collecting the eggs, the number of eggs need not be counted since the number of trays arranged within a basket or carrier 24 designed to receive the trays will indicate the number of eggs which have been collected.

The carrier 24 is preferably square or rectangular and is designed to be placed within the casing 26 of an egg washer 28 as shown in Figs. 4 and 5. The casing is generally rectangular in shape and larger than the carrier 24. Further, the casing is provided with rounded corners 30 which aid in directing the circulating liquid and eliminate eddy currents and pockets in which dirt removed from the eggs may accumulate. The liquid is circulated by any suitable means and, as shown, a propeller 32 driven by a motor 34 is arranged adjacent one end of the casing 26 so as to circulate washing liquid horizontally within the casing and through the channels formed between the cavities and projections of the egg holding trays.

As shown in Figs. 3 and 4, the trays are stacked within the carrier 24 and serve to define channels 36 extending both longitudinally and transversely within the casing 26 whereby the detergent or washing liquid circulated by the propeller 32 is caused to flow in a controlled manner through and about the openings 10 in the projections 8 and the openings 15 about the sides of the cavities 4. During such circulation of the liquid, the eggs 12 are ordinarily moved slightly and rocked about by the liquid flowing through the openings 10 into contact with the eggs. The sides of the eggs are thus brought into contact with the edges of the openings 10 affording a mild scraping action which aids in removing dirt or solid matter from the surface of the eggs during the washing operation. The controlled and organized flow of liquid through and about the eggs and the known number of eggs which are contained within the carrier 24 render it possible to use a predetermined and accurate amount of liquid and detergent in washing the eggs. Furthermore, the arrangement of the eggs and the openings in the projections and recesses in the trays assure the most efficient circulation of the liquid about the eggs and into contact with the surface thereof. The length of time required to wash the eggs can therefore be reduced to a minimum, whereas every single egg is subjected to the same washing action by the detergent liquid circulated within the casing of the washer.

Upon conclusion of a washing operation the carrier 24 is lifted out of the casing whereupon the washing liquid drains freely and completely from the eggs preventing the retention of liquid on the eggs. The free circulation of air through the openings in the projections and recesses further serves to assure rapid drying of the eggs so that water spots are not formed on the eggs and all danger of rotting and spoilage of the eggs due to excessive moisture is avoided.

The washed eggs which are still supported by the egg holding trays can then be transferred directly in the trays to incubators, egg candling and grading equipment and if desired, the trays containing the eggs may be inserted directly into crates for shipping. The eggs therefore need not be handled individually at any time after they are first collected. In actual practice, the amount of breakage, checking and cracking of eggs is materially reduced by the reduced handling thereof, whereas the ventilating, washing and drying of the eggs is rendered more uniform and rapid by the orderly positioning and individual support thereof on the trays.

While the trays are preferably generally rectangular in shape, the trays may be circular in form as shown at 50 in Fig. 6. Such trays may be employed with conventional circular egg collecting baskets 52 by stacking the trays one upon another in the basket. Further, the basket containing the trays with a definite number of eggs held thereon and arranged in a spaced and orderly manner can be immersed in a circular form of egg washer 54. However, the trays may be otherwise constructed to support and maintain the eggs in a uniform arrangement affording maximum freedom of circulation of air and liquid about the eggs.

In the preferred form of the invention, the egg holding trays are formed of stiff or substantially rigid plastic material which prevents sagging or displacement of the trays during use and which further prevents deterioration of the tray by the action of the washing liquid circulated in contact therewith. However, if desired, the trays may be made of aluminum or other sheet metal material or they may be formed of wire or the like constructed and arranged in a suitable fashion to support the eggs in an orderly arrangement providing channels therebetween.

These and other changes and modifications may be made in the form, construction and arrangement of the various elements employed, and in view thereof, it should be understood that the particular embodiments of the invention shown in the drawing and described above are intended to be illustrative only and are not intended to limit the scope of the invention.

We claim:

1. Egg washing equipment comprising a casing having a chamber therein for receiving egg cleaning liquid, a carrier removably fitting within said chamber, a plurality of egg holding trays removably supported in stacked relation within said carrier, said trays being made of material which is not substantially adversely affected by the cleaning liquid and each formed with egg receiving recesses surrounded by upstanding projections defining regularly arranged channels between the trays controlling the flow of said egg cleaning liquid within the chamber, said recesses and projections having openings in the sides thereof through which liquid may flow into and out of contact with eggs supported by the trays, and means for circulating said liquid through said channels and openings and about eggs supported by said trays.

2. Egg washing equipment comprising a casing having a chamber therein for receiving egg cleaning liquid, a carrier removably fitting within said chamber, a plurality of egg holding trays removably supported in stacked relation within said carrier, said trays being made of material which is not substantially adversely affected by the cleaning liquid and each formed with egg receiving recesses surrounded by upstanding projections defining regularly arranged channels between the trays controlling the flow of said egg cleaning liquid within the chamber, said recesses having drainage openings in the bottoms thereof and said recesses and projections having openings in the sides thereof engageable by eggs positioned in said recesses, and means for circulating said liquid through said channels and openings and about eggs supported by said trays.

3. Egg washing equipment comprising a casing having a generally rectangular chamber therein for receiving egg cleaning liquid, a rectangular carrier removably fitting within said chamber, a plurality of egg holding trays having egg receiving recesses formed therein and arranged in parallel rows longitudinally and transversely of the trays, said trays being made of material which is not substantially adversely affected by the cleaning liquid, said trays having projections positioned about the sides of said recesses and extending upward therefrom with the recesses on one tray registering with and resting upon the projections on a lower tray whereby the projections and recesses cooperate to define parallel channels between the trays, said recesses and projections having openings in the sides thereof through which liquid may flow, and means for circulating said cleaning liquid through said channels and openings into contact with eggs supported by said trays.

4. Egg washing equipment comprising a casing having a chamber therein for receiving egg cleaning liquid, a plurality of egg supporting trays arranged in stacked relation within said chamber, each of said trays being formed of a sheet of material which is not substantially adversely affected by the cleaning liquid and formed with regularly arranged recesses projecting below the plane of said sheet and with projections extending upward from said plane about said recesses, there being openings in the bottoms of said recesses for the drainage of liquid therefrom, the side walls of said projections and recesses having openings therein located above and below the plane of said sheet for the circulation of liquid into contact with both the upper and lower portions of eggs supported in said recesses, and means for circulating cleaning liquid about said trays and through said openings into contact with eggs supported thereby.

5. Egg washing equipment comprising a casing having a chamber therein for receiving egg cleaning liquid, an egg supporting tray located in said chamber and formed of a sheet of material which is not substantially adversely affected by the cleaning liquid, said sheet having regularly arranged recesses projecting below the plane of said sheet and having projections extending upward from said plane about said recesses, there being openings in the bottom of said recesses for the drainage of liquid therefrom, the side walls of said projections and recesses having openings therein located above and below the plane of said sheet for the passage of liquid into contact with both the upper and lower portions of eggs supported in said recesses, and means for passing cleaning liquid through said recesses and openings into contact with eggs supported by said tray.

6. Egg washing equipment comprising a chamber, an egg supporting tray in said chamber formed of a sheet of material which is not substantially adversely affected by cleaning liquid, said sheet having regularly arranged recesses projecting below the plane of the sheet for receiving eggs to be washed and having projections extending upward from said plane about said recesses, there being openings in the bottom of said recesses for the drainage of liquid therefrom, the side walls of said projections having elongated openings therein extending from points adjacent the plane of said sheet to points near the top of said projections and occupying extended areas in the side walls of the projections, and means for circulating washing liquid into contact with eggs in said recesses and through said openings into and out of contact with eggs supported by the tray.

References Cited in the file of this patent

UNITED STATES PATENTS

| 892,104 | Whelan | June 30, 1908 |
| 1,956,955 | Kronenberger | May 1, 1934 |
| 2,045,771 | Graham | June 30, 1936 |
| 2,108,489 | Johnson et al. | Feb. 15, 1938 |
| 2,651,311 | Rule | Sept. 8, 1953 |
| 2,662,659 | Putnam | Dec. 15, 1953 |

FOREIGN PATENTS

| 857,219 | France | Dec. 20, 1953 |
| | (Addition to 55,120) | |
| 697,884 | Germany | Oct. 25, 1940 |
| 1,070,810 | France | Feb. 24, 1954 |